(12) United States Patent
Erne (10) Patent No.: US 11,828,679 B2
(45) Date of Patent: Nov. 28, 2023

(54) DIFFERENTIAL CAPILLARY VISCOMETER AND RELATED METHOD FOR DETERMINING VISCOSITY

(71) Applicant: Haiku Instruments, LLC, Houston, TX (US)

(72) Inventor: John Thomas Erne, Houston, TX (US)

(*) Notice: Subject to any disclaimer, the term of this patent is extended or adjusted under 35 U.S.C. 154(b) by 8 days.

(21) Appl. No.: 17/446,780

(22) Filed: Sep. 2, 2021

(65) Prior Publication Data

US 2023/0064956 A1 Mar. 2, 2023

(51) Int. Cl.
| | |
|---|---|
| *G01N 11/04* | (2006.01) |
| *G01N 9/10* | (2006.01) |
| *G01N 9/04* | (2006.01) |
| *G01N 9/26* | (2006.01) |
| *G01N 9/14* | (2006.01) |

(52) U.S. Cl.
CPC .............. *G01N 11/04* (2013.01); *G01N 9/10* (2013.01); *G01N 9/14* (2013.01); *G01N 9/26* (2013.01)

(58) Field of Classification Search
CPC ........ G01N 11/04; G01N 30/20; G01N 35/10; G01N 35/1095; G01N 35/1097
See application file for complete search history.

(56) References Cited

U.S. PATENT DOCUMENTS

| | | | | |
|---|---|---|---|---|
| 4,627,271 | A * | 12/1986 | Abbott .................... | G01N 11/08 73/54.06 |
| 2001/0037674 | A1* | 11/2001 | Petro .................... | B01J 19/0046 73/61.52 |
| 2002/0166367 | A1 | 11/2002 | Bures | |
| 2008/0245133 | A1* | 10/2008 | Titterton ................ | G01N 11/08 73/54.01 |
| 2022/0389800 | A1* | 12/2022 | Warner ................... | E21B 21/08 |

FOREIGN PATENT DOCUMENTS

| | | |
|---|---|---|
| CN | 87209341 U | 8/1988 |
| EP | 1949060 B1 | 1/2019 |

OTHER PUBLICATIONS

Extended European Search Report issued in corresponding European Application No. 22193504.2, dated Jan. 27, 2023, 13 pages.

(Continued)

*Primary Examiner* — Kristina M Deherrera
*Assistant Examiner* — Fatemeh Esfandiari Nia
(74) *Attorney, Agent, or Firm* — Patrick D. Duplessis (57) ABSTRACT

A viscometer includes first and second capillaries and a valve. In a first state, the valve connects the second capillary to a first fluid injector via the first capillary. In a second state, the valve connects the second capillary to a second fluid injector. A controller receives data indicative of respective pressure drops within the first and second capillaries, and generates a pressure ratio signal therefrom. The controller analyzes the pressure ratio signal to determine an end of a transition between a first equilibrium when the valve is in the first state, and a second equilibrium when the valve is in the second state. The controller defines a measurement window based on the transition end, and therein determines a viscosity of the second fluid based on the pressure ratio signal. The first fluid is a solvent, and the second fluid is a solution of a same solvent and a solute.

39 Claims, 7 Drawing Sheets

(56) References Cited

OTHER PUBLICATIONS

Sison Cristina P. et al: "Simultaneous Confidence Intervals and Sample Size Determination for Multinomial Proportions", Journal of the American Statistical Association, Mar. 1, 1995 (Mar. 1, 1995), pp. 366-369, XP093015433, Alexandria, VA DOI: 10.1080/01621459. 1995.10476521 Retrieved from the Internet: URL:http://links.jstor. org/sici?sici=0162-1459%28199503%2990%3A429%3C366% 3ASCIASS%3E 2.0.CO%3B2-W [retrieved on Jan. 18, 2023].

\* cited by examiner

DIFFERENTIAL CAPILLARY VISCOMETER AND RELATED METHOD FOR DETERMINING VISCOSITY

TECHNICAL FIELD

The present disclosure generally relates to viscometers, and more particularly relates to an improved differential capillary viscometer and a related method for determining viscosity.

BACKGROUND

There are various known devices for measuring the viscosity of a fluid. These include a range of manual-intensive glass-tube capillary viscometers, which can be used for measuring a polymer's solution viscosity based on time flow through a capillary versus a pure dissolution solvent. Also present in the market are automated differential capillary viscometers such as the Intrinsic Viscosity Analyzer (IVA) instrument sold by Polymer Characterization, S.A. of Valencia, Spain, for example.

Known differential capillary viscometers use computer-drive data acquisition systems and rely on fixed time-based measurement durations (e.g., 90 seconds, 120 seconds, 180 seconds, etc.). Measurements of liquid sample are taken for fixed durations to form a measurement set. A post-hoc analysis is performed to determine which measurements within the measurement set are used as the final reported measurement values. This measurement and analysis technique can be problematic in that it is time consuming and wastes resources (e.g., solvent, solute).

Known differential capillary viscometers typically include a sample injection valve with six ports to interface a liquid sample handling system with the viscometer's flow path. The six-port valve includes two ports for flow path in and out, two ports for a fixed-volume loop, and two ports for sample loading and overflow (e.g., to waste). The six-port valve has two states, commonly referred to as "load" and "inject". In the "load" state, the fixed-volume loop is connected to the two ports for sample loading and overflow, which allows the sample to be transferred into the loop (e.g., via a pump). Once the sample is loaded into the fixed-volume loop, the viscometer then toggles the six-port valve to the "inject" state, which connects the fixed-volume loop to the flow path and disconnects the fixed-volume loop from the sample loading path. This configuration can be problematic in that, for every subsequent sample to be prepared for injection, the valve must be again toggled to the "load" state for loading, and the valve again toggled to the "inject" state for injection of the loaded sample. This loading process often takes 2 to 5 minutes in known differential capillary viscometers, which increases the total sample measurement time by a factor of 2 to 4.

Aspects of the present invention are directed to these and other problems.

SUMMARY

According to an aspect of the present invention, a differential capillary viscometer includes a first pressure module, a second pressure module, a first fluid injector, a second fluid injector, a valve, and a controller. The first pressure module includes a first capillary and a first pressure sensor. The second pressure module includes a second capillary and a second pressure sensor. The first fluid injector is configured to inject a first fluid into the first pressure module such that the first fluid flows through the first capillary. The second fluid injector is configured to inject a second fluid into the second pressure module such that the second fluid flows through the second capillary. The valve is actuatable between at least a first state, in which the valve fluidly connects the second capillary to the first fluid injector via the first capillary, and a second state, in which the valve fluidly connects the second capillary to the second fluid injector. The controller is configured to: receive first pressure data generated by the first pressor sensor, the first pressure data indicative of a pressure drop within the first capillary; receive second pressure data generated by the second pressor sensor, the second pressure data indicative of a pressure drop within the second capillary; generate a pressure ratio signal corresponding to a ratio of respective magnitudes of the first pressure data and the second pressure data; analyze the pressure ratio signal to determine an end time of a first transition period occurring between a first equilibrium period, during which the valve is in the first state and only the first fluid flows through the first capillary and the second capillary, and a second equilibrium period, during which the valve is in the second state and only the first fluid flows through the first capillary and only the second fluid flows through the second capillary; define a measurement window based on the determined end time of the first transition period; and determine a viscosity of the second fluid based on a magnitude of the pressure ratio signal within the measurement window.

According to another aspect of the present invention, a viscometer includes a first capillary, a second capillary, a first fluid injector, a second fluid injector, a valve, and a controller. In a first state, the valve connects the second capillary to the first fluid injector via the first capillary. In a second state, the valve connects the second capillary to the second fluid injector. The controller is configured to: receive pressure data indicative of respective pressure drops within the first capillary and the second capillary during fluid flow therethrough; generate a pressure ratio signal from the pressure data; analyze the pressure ratio signal to determine an end of a transition between a first equilibrium when the valve is in the first state, and a second equilibrium when the valve is in the second state; define a measurement window based on the end of the transition; and determine a viscosity of the second fluid based on the pressure ratio signal during the measurement window.

According to another aspect of the present invention, a method for determining viscosity includes the steps of: providing a first pressure module having a first capillary; providing a second pressure module having a second capillary; providing a valve fluidly connected between the first capillary and the second capillary, the valve having at least a first state and a second state; generating a pressure ratio signal corresponding to a ratio of respective pressure drops within the first capillary and the second capillary; analyzing the pressure ratio signal to determine an end time of a first transition period occurring between a first equilibrium period, during which the valve is in the first state and only the first fluid flows through the first capillary and the second capillary, and a second equilibrium period, during which the valve is in the second state and only the first fluid flows through the first capillary and only the second fluid flows through the second capillary; defining a measurement window based on the determined end time of the first transition period; and determining a viscosity of the second fluid based on a magnitude of the pressure ratio signal within the measurement window.

In addition to, or as an alternative to, one or more of the features described above, further aspects of the present invention can include one or more of the following features, individually or in combination:

the first fluid is a first solvent, the second fluid is a solution of a second solvent and a solute, and the first solvent and the second solvent have a same composition;

the first fluid is a first solvent, the second fluid is a solution of a second solvent and a solute, and the first solvent and the second solvent have different compositions;

in the first state, a first fluid loop of the valve receives the first fluid from the first capillary and outputs the first fluid to the second capillary, and a second fluid loop of the valve receives the second fluid from the second fluid injector, and upon actuation from the first state to the second state, the second fluid in the second fluid loop is immediately output to the second capillary, and during the first transition period, the first fluid present within the second capillary is displaced by the second fluid output to the second capillary;

during the first transition period, the first fluid present within the second capillary is displaced by the second fluid injected from the second fluid injector;

the controller determines the end time of the first transition period by executing a confidence-interval-based algorithm;

the controller determines the end time of the first transition period by executing a signal stability determination algorithm;

the controller determines the end time of the first transition period by executing the following steps: (a) defining a first interval window; (b) defining a second interval window after the first interval window; (c) determining whether an equilibrium condition has been met based on a comparison of respective average magnitudes of the pressure ratio signal during the first and second interval windows; (d) if the equilibrium condition has not been met, shifting the first interval window and the second interval window forward in time by a predetermined amount and repeating the determining step (c); and (e) if the equilibrium condition has been met, determining the end time of the first transition period to be an end time of the second interval window;

the equilibrium condition is met only when a rolling window range (RWR) value is less than or equal to a confidence value, and the RWR value is equal to the average magnitude of the pressure ratio signal during the first interval window divided by the average magnitude of the pressure ratio signal during the second interval window;

the confidence value is equal to a noise value divided by a confidence factor;

the equilibrium condition is met only when a rolling window range (RWR) satisfies the set of predetermined signal stability determination algorithm's criteria;

stability criteria include at least one of: a maximum number of rolling windows to evaluate, comparisons of truncated average pressure ratio signals from window to subsequent window, and comparison of the maximum versus minimum truncated average pressure ratio signals across the entire set of rolling windows;

the pressure ratio signal is a discrete-time signal includes a pressure ratio signal data points generated at a predetermined sample rate;

the noise value is based on a plurality of the pressure ratio signal data points collected during a predetermined noise window;

the controller is configured to actuate the valve between the first state and the second state;

the first transition period starts when the valve is actuated from the first state to the second state;

the measurement window starts at the determined end time of the first transition period;

the measurement window is not defined until after actuation of the valve from the first state to the second state;

the measurement window is a time period during the second equilibrium period;

the measurement window has a predetermined duration; and the controller is configured to actuate the valve from the second state back to the first state immediately after the measurement window;

a second transition period starts when the valve is actuated from the second state back to the first state, and during the second transition period, the second fluid present within the second capillary is displaced by the first fluid injected from the first fluid injector;

the controller determines the end time of the second transition period by executing the following steps: (a) defining a first interval window; (b) defining a second interval window after the first interval window; (c) determining whether an equilibrium condition has been met based on a comparison of respective average magnitudes of the pressure ratio signal during the first and second interval windows; (d) if the equilibrium condition has not been met, shifting the first interval window and the second interval window forward in time by a predetermined amount and repeating the determining step (c); and (e) if the equilibrium condition has been met, determining the end time of the first transition period to be an end time of the second interval window;

the valve has at least 8 ports;

the valve is an 8-port, 2-position valve; and the viscometer further includes a constant temperature chamber that houses at least one of the first pressure module and the second pressure module.

These and other aspects of the present invention will become apparent in light of the drawings and detailed description provided below.

BRIEF DESCRIPTION OF THE DRAWINGS

FIGS. 1 and 2 schematically illustrate the viscometer according to the present teachings. In FIG. 1, the valve of the viscometer is in a first state. In FIG. 2, the valve is in a second state.

FIGS. 3 and 4 schematically illustrate the valve of FIGS. 1 and 2.

DETAILED DESCRIPTION

Figure 1:
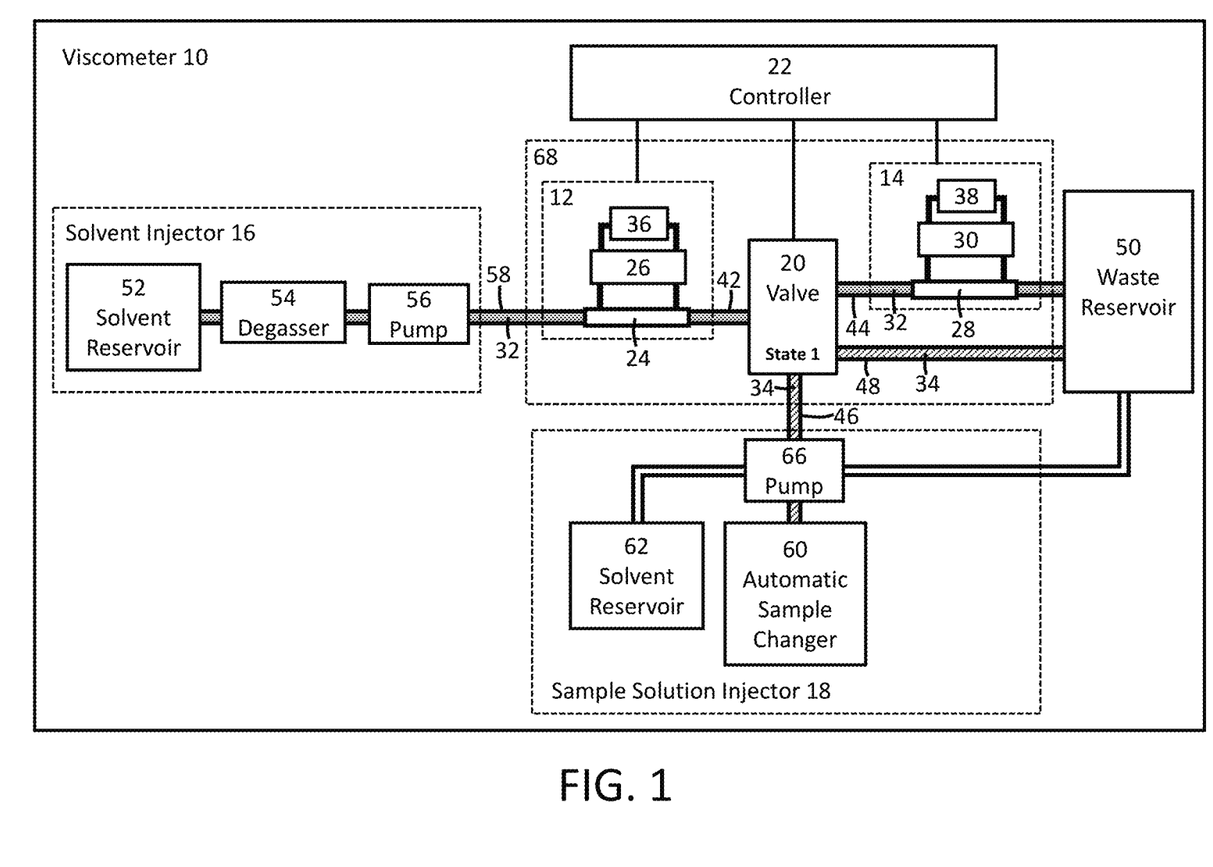
Figure 2:
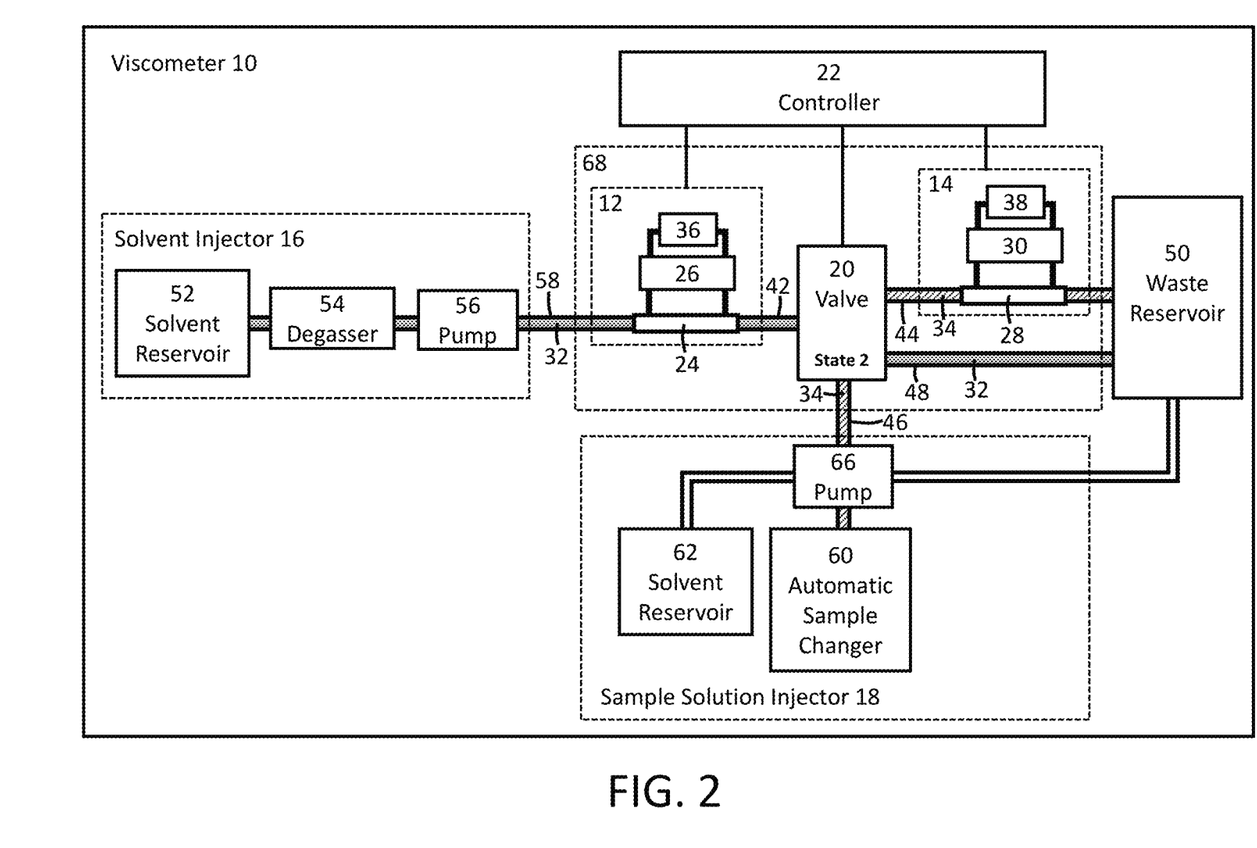

Referring to FIGS. 1 and 2, the present disclosure describes an improved differential capillary viscometer 10, and a related method for measuring viscosity.

The differential capillary viscometer 10 includes a first pressure module 12, a second pressure module 14, a first fluid injector 16, a second fluid injector 18, a valve 20, and a controller 22. The first pressure module 12 includes a first capillary 24 and a first pressure sensor 26. The second pressure module 14 includes a second capillary 28 and a second pressure sensor 30. The first fluid injector 16 is configured to inject a first fluid 32 (e.g., a solvent) into the first pressure module 12 such that the first fluid 32 flows through the first capillary 24. The second fluid injector 18 is configured to inject a second fluid 34 (e.g., a solution of a same solvent and a sample solute) into the second pressure module 14 such that the second fluid 34 flows through the second capillary 28. The valve 20 is actuatable between at least a first state (FIGS. 1 and 3) and a second state (FIGS. 2 and 4). In the first state, the valve 20 fluidly connects the second capillary 28 to the first fluid injector 16 via the first capillary 24. In the second state, the valve 20 fluidly connects the second capillary 28 to the second fluid injector 18.

Referring still to FIGS. 1 and 2, the controller 22 is configured to receive first pressure data generated by the first pressor sensor 26, and second pressure data generated by the second pressor sensor 30. The first pressure data is indicative of a pressure drop of a fluid flowing through the first capillary 24, and the second pressure data is indicative of a pressure drop of a fluid flowing through the second capillary 28.

Figure 5:
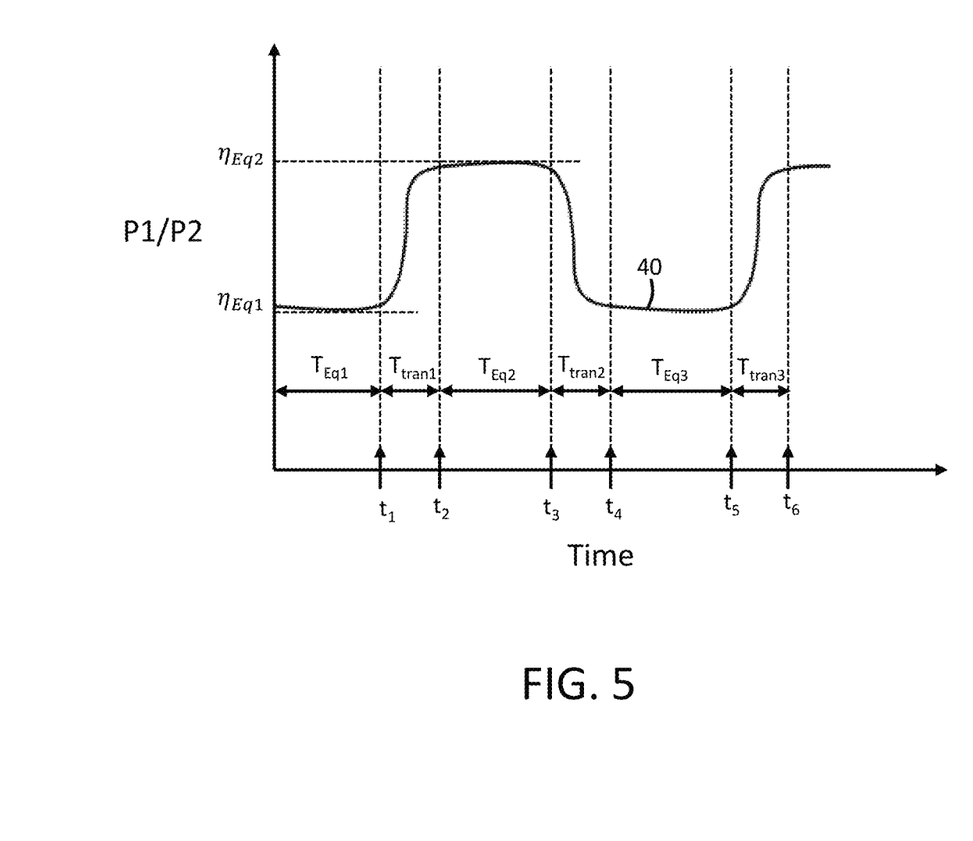
FIG. 5 is a plot of the pressure ratio signal generated over time by the controller of FIGS. 1 and 2.

Referring to FIG. 5, the controller 22 is further configured to generate a pressure ratio signal 40 corresponding to a ratio of respective magnitudes of the first pressure data and the second pressure data, and is configured to analyze the pressure ratio signal 40 to determine an end time $t_2$ of a first transition period $T_{tran1}$ occurring between a first equilibrium period $T_{Eq1}$ and a second equilibrium period $T_{Eq2}$. The pressure ratio signal 40 is a discrete-time signal that includes pressure ratio signal data points (FIGS. 6 and 7) generated at a predetermined sample rate (e.g., 16 Hz).

During the first equilibrium period $T_{Eq1}$, the valve 20 is in the first state (FIGS. 1 and 3) and only the first fluid 32 flows through the first capillary 24 and the second capillary 28. During the second equilibrium period $T_{Eq2}$, the valve 20 is in the second state (FIGS. 2 and 4) and only the first fluid 32 flows through the first capillary 24 and only the second fluid 34 flows through the second capillary 28.

Figure 6:
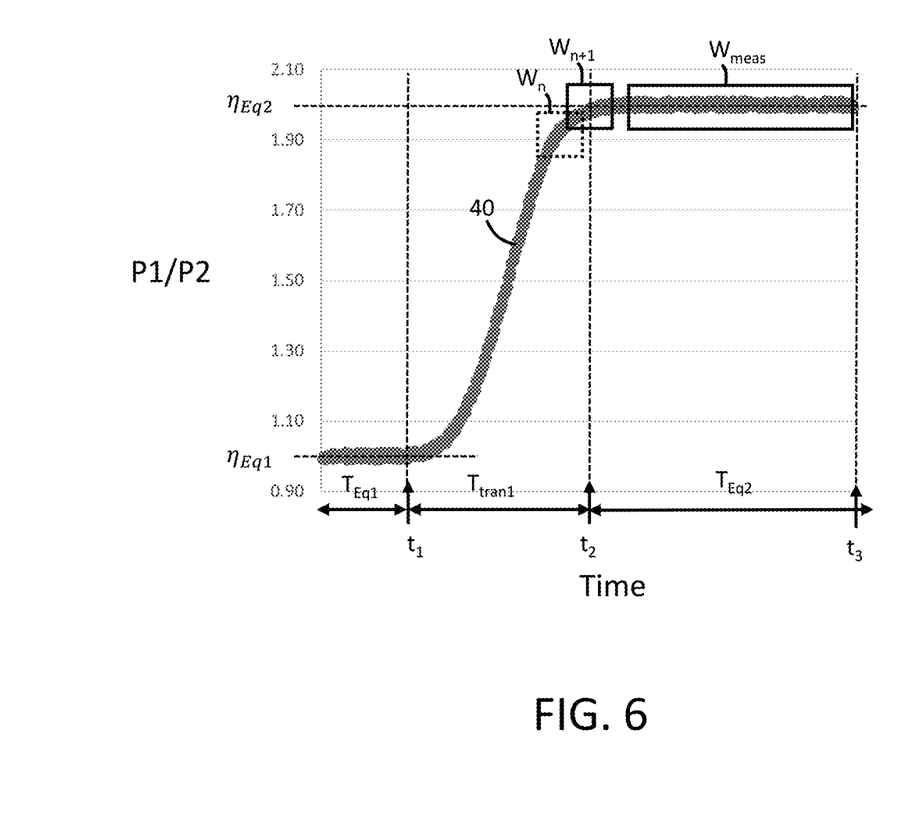
FIG. 6 provides a magnified view of the plot of FIG. 5.
Figure 7:
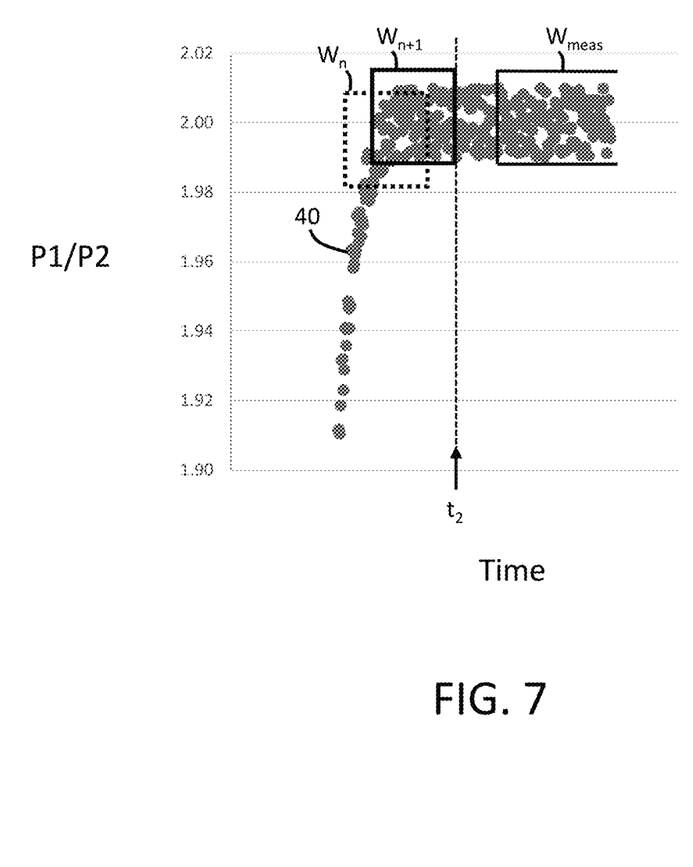
FIG. 7 provides a further magnified view of the plot of FIG. 5.

Referring to FIGS. 6 and 7, the controller 22 is further configured to define a measurement window $W_{meas}$ based on the determined end time $t_2$ of the first transition period $T_{tran1}$, and is configured to determine a viscosity of the second fluid 34 based on a magnitude of the pressure ratio signal 40 within the measurement window $W_{meas}$. In the illustrated embodiment, the measurement window $W_{meas}$ is a time period with a predetermined duration during the second equilibrium period $T_{Eq2}$, and there is a predetermined time delay between the determined end time $t_2$ of the first transition period $T_{tran1}$ and the beginning of the measurement window $W_{meas}$. In other embodiments, the measurement window $W_{meas}$ begins at the determined end time $t_2$ of the first transition period $T_{tran1}$.

Advantageously, the total duration between the start time $t_1$ of the first transition period $T_{tran1}$ (which corresponds with actuation of the valve 20 from the first state to the second state) and the end time of the measurement window $W_{meas}$ can be significantly less than that of a prior art viscometer. This is because prior art viscometers are not configured to determine the end time $t_2$ of the first transition period $T_{tran1}$, and therefore must allow for a relatively longer delay between the start time $t_1$ of the first transition period $T_{tran1}$ and the start time of the measurement window $W_{meas}$ to ensure that the viscosity is determined using data from only the second equilibrium period $T_{Eq2}$ and not the first transition period $T_{tran1}$. In the present viscometer 10, a start time and an end time of the measurement window $W_{meas}$ are not determined until the controller 22 determines the end time $t_2$ of the first transition period $T_{tran1}$. That is, the start time and an end time of the measurement window $W_{meas}$ are not determined until after actuation of the valve 20 from the first state to the second state. The measurement window $W_{meas}$ can begin as soon as the controller 22 determines the end time $t_2$ of the first transition period $T_{tran1}$. This improvement over prior art viscometers allows the present viscometer 10 to shorten the total cycle time for each measurement (e.g., the total duration of the first equilibrium period $T_{Eq1}$, the first transition period $T_{tran1}$, the second equilibrium period $T_{Eq2}$, the second transition period $T_{tran2}$), and thereby allows more measurement cycles to be performed in a same timeframe as a prior art viscometer. This improvement also has the effect of reducing the amount of materials (e.g., solvent, solute) needed to perform measurements, which can have substantial cost savings.

Figure 3:
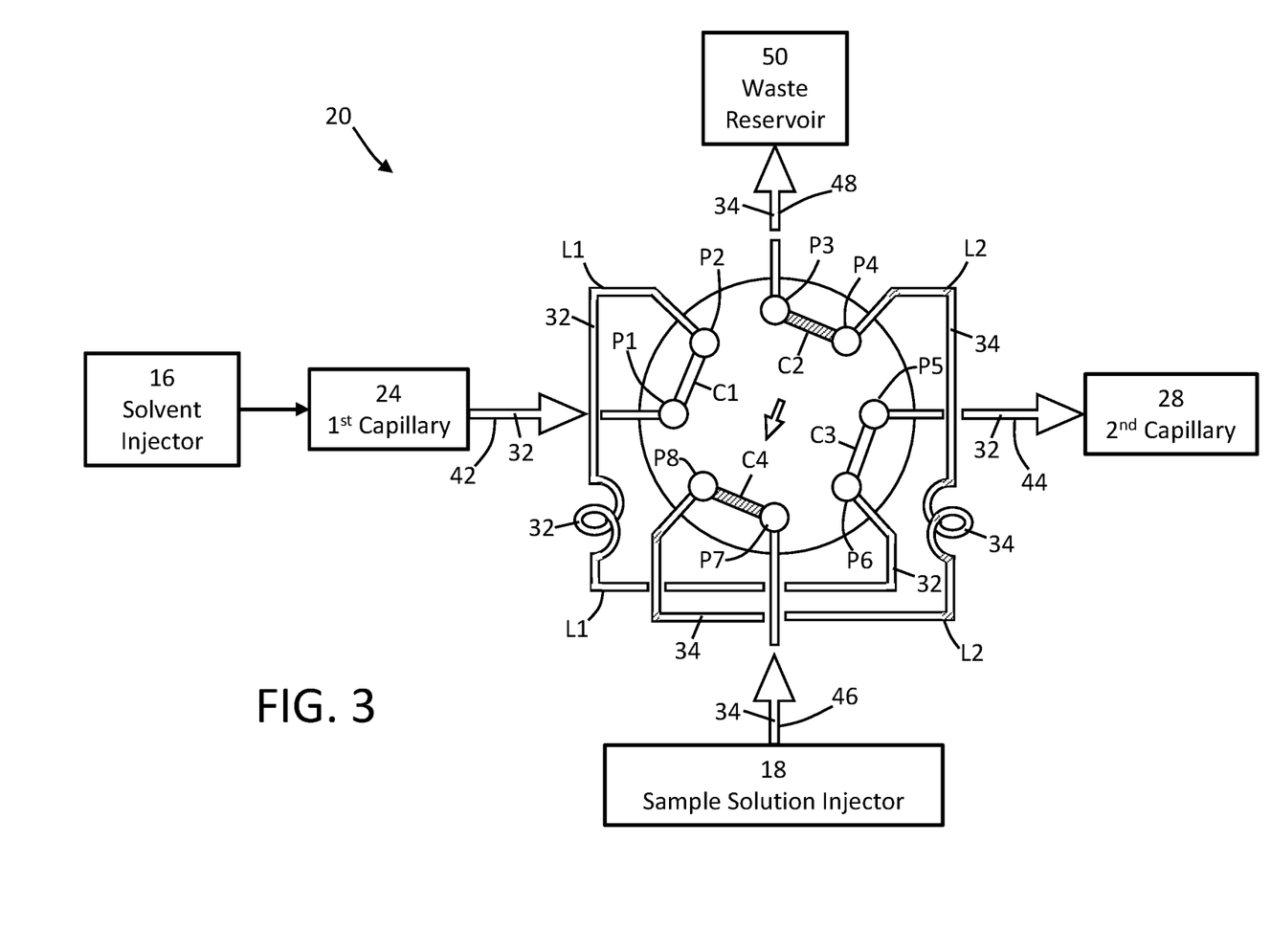
In FIG. 3, the valve is in a first state.
Figure 4:
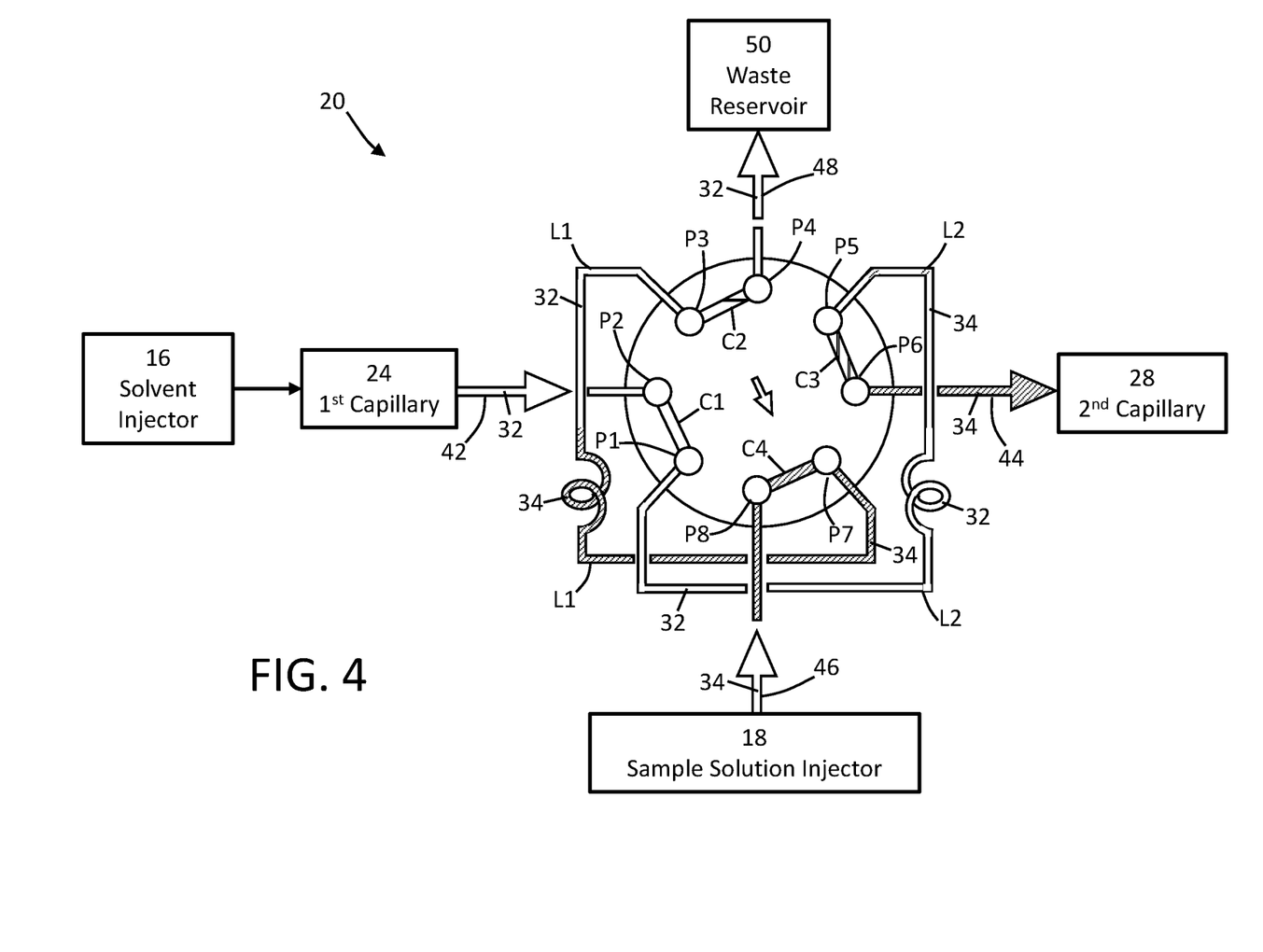
In FIG. 4, the valve is in a second state.

Referring to FIGS. 3 and 4, the valve 20 is configured such that, in the first state (FIGS. 1 and 3), a first fluid loop L1 of the valve 20 receives the first fluid 32 (e.g., a solvent) from the first capillary 24 and outputs the first fluid 32 to the second capillary 28, and a second fluid loop L2 of the valve 20 receives the second fluid 34 from the second fluid injector 18. Upon actuation from the first state to the second state, the second fluid 34 present in the second fluid loop L2 is immediately output to the second capillary 28. During the first transition period $t_{r1}$, the first fluid 32 present within the second capillary 28 is gradually displaced by the second fluid 34 output to the second capillary 28. The present viscometer 10 therefore allows for back-to-back-to-back measurements without any need to stop for loading of a new sample solution, as is the case with prior art viscometers. Again, this improvement over prior art viscometers allows the present viscometer 10 to shorten the total cycle time for each measurement, and thereby allows more measurement cycles to be performed in a same timeframe as a prior art viscometer. This improvement also has the effect of reducing the amount of materials (e.g., solvent, solute) needed to perform measurements, which can have substantial cost savings.

The valve 20 can be configured in various different ways. Referring to FIGS. 3 and 4, in the illustrated embodiment, the valve 20 is an 8-port, 2-position valve commercially sold by Valco Instruments Co. Inc. of Houston, Tex. The valve 20 includes a first port P1, a second port P2, a third port P3, a fourth port P4, a fifth port P5, a sixth port P6, a seventh port P7, and an eighth port P8. The first port P1 and the second port P2 are fluidly connected by a first connector C1. The third port P3 and the fourth port P4 are fluidly connected by a second connector C2. The fifth port P5 and the sixth port P6 are fluidly connected by a third connector C3. The seventh port P7 and the eighth port P8 are fluidly connected by a fourth connector C4.

Referring still to FIGS. 3 and 4, in the first state of the valve 20 (FIG. 3), the first port P1 is fluidly connected to the outlet 42 of the first capillary 24, the second and sixth ports P2, P6 are fluidly connected to opposing ends of the first fluid loop L1 of the valve 20, and the fifth port P5 is fluidly connected to an inlet 44 of the second capillary 28. Also in the first state of the valve 20 (FIG. 3), the seventh port P7 is fluidly connected to the outlet 46 of the second fluid injector 18, the fourth and eighth ports P4, P8 are fluidly connected to opposing ends of a second fluid loop L2 disposed external relative to the valve 20, and the third port P3 is fluidly connected to the conduit 48 to the waste reservoir 50. In the second state of the valve 20 (FIG. 4), the second port P2 is fluidly connected to the outlet 42 of the first capillary 24, the first and fifth ports P1, P5 are fluidly connected to opposing ends of the second fluid loop L2, and the sixth port P6 is fluidly connected to the inlet 44 of the second capillary 28. Also in the second state of the valve 20 (FIG. 4), the eighth port P8 is fluidly connected to the outlet 46 of the second fluid injector 18, the third and seventh ports P3, P7 are fluidly connected to opposing ends of the first fluid loop L1, and the fourth port P4 is fluidly connected to the conduit 48 to the waste reservoir 50.

Referring again to FIGS. 1 and 2, the first and second pressure modules 12, 14 can be configured in various different ways. In the illustrated embodiment, the first pressure module 12 includes the first capillary 24, the first pressure sensor 26 disposed relative to the first capillary 24, and a first purge valve 36 disposed relative to the first pressure sensor 26. Similarly, the second pressure module 14 includes the second capillary 28, the second pressure sensor 30 disposed relative to the second capillary 28, and a second purge valve 38 disposed relative to the second pressure sensor 30. The first capillary 24 and the second capillary 28 have fixed, predetermined dimensions (e.g., length, width). In the illustrated embodiment, the dimensions of the first capillary 24 are the same as those of the second capillary 28. In other embodiments, the first capillary 24 has one or more dimensions that differ from those of the second capillary 28.

Referring still to FIGS. 1 and 2, the first fluid injector 16 can be configured in various different ways. In the illustrated embodiment, the first fluid injector 16 is configured to inject the first fluid 32 (e.g., a solvent) into the first pressure module 12. The first fluid injector 16 includes a solvent reservoir 52, a solvent degasser 54, and a first pump 56. The solvent reservoir 52 is a tank or other housing suitable for storing the first fluid 32 until it is ready for use. The solvent degasser 54 is configured to remove small bubbles that may become enveloped and entrapped in the first fluid 32. The first fluid injector 16 has several fluid conduits (e.g., pipes, tubes, etc.), including an outlet 46 that fluidly connects the first fluid injector 16 to the first capillary 24 of the first pressure module 12. In the illustrated embodiment, the first pump 56 is a syringe pump. In other embodiments, the first fluid injector 16 additionally or alternatively includes another type of pump suitable for injecting the first fluid 32 into the first pressure module 12.

Referring still to FIGS. 1 and 2, the second fluid injector 18 can be configured in various different ways. In the illustrated embodiment, the second fluid injector 18 is configured to inject the second fluid 34 (e.g., a sample solution of a solvent and a sample solute) into the second pressure module 14 via the valve 20, and the solvent included in the first fluid 32 (i.e., the sample solution) is the same as (e.g., has a same composition as) the solvent of the first fluid 32. In other embodiments, the solvent included in the first fluid 32 is different than the solvent of the first fluid 32. In the illustrated embodiment, the second fluid injector 18 includes an automatic sample changer 60, a solvent reservoir 62, and a second pump 66. The automatic sample changer 60 is a robotic sampling device with positions for multiple samples in queue to be injected by the second fluid injector 18. Similarly, the solvent reservoir 62 is a tank or other housing suitable for storing solvent until it is ready for mixing with the sample solute to form the sample solution of the second fluid 34. The second fluid injector 18 has several fluid conduits (e.g., pipes, tubes, etc.), including the outlet 46 that fluidly connects the second fluid injector 18 to the valve 20. In the illustrated embodiment, the second pump 66 is a syringe pump. In other embodiments, the second fluid injector 18 additionally or alternatively includes another type of pump suitable for injecting the second fluid 34 into the second pressure module 14 via the valve 20.

In some embodiments, the viscometer 10 includes one or more additional components. In the illustrated embodiment, for example, the viscometer 10 further includes a constant temperature chamber 68 that houses at least one of the first pressure module 12 and the second pressure module 14 and provides constant a temperature therefor. The viscometer 10 also includes a waste reservoir 50 configured to receive the first fluid 32 and/or the second fluid 34 output from the second capillary 28.

As discussed above, the controller 22 is further configured to generate a pressure ratio signal 40 corresponding to a ratio of respective magnitudes of the first pressure data and the second pressure data, and is configured to analyze the pressure ratio signal 40 to determine an end time $t_2$ of a first transition period $T_{tran1}$ occurring between a first equilibrium period $T_{Eq1}$ and a second equilibrium period $T_{Eq2}$. In the illustrated embodiment, the controller 22 determines the end time $t_2$ of the first transition period $T_{tran1}$ by executing a confidence-interval-based algorithm. In particular, the controller 22 determines the end time $t_2$ of the first transition period $T_{tran1}$ by executing the following steps: (a) defining a first interval window $W_n$; (b) defining a second interval window $W_{n+1}$ after the first interval window $W_n$; (c) determining whether an equilibrium condition has been met based on a comparison of respective average magnitudes of the pressure ratio signal 40 during the first and second interval windows $W_n$, $W_{n+1}$; (d) if the equilibrium condition has not been met, shifting the first interval window $W_n$ and the second interval window $W_{n+1}$ forward in time by a predetermined amount and repeating the determining step (c); and (e) if the equilibrium condition has been met, determining the end time $t_2$ of the first transition period $T_{tran1}$ to be an end time of the second interval window $W_{n+1}$.

According to the confidence-interval-based algorithm, the equilibrium condition is met only when a rolling window range (RWR) value is less than or equal to a confidence value. The RWR value is equal to (i) the average magnitude of the pressure ratio signal 40 during the first interval window $W_n$, divided by (ii) the average magnitude of the pressure ratio signal 40 during the second interval window $W_{n+1}$. The confidence value is equal to a noise value divided by a confidence factor, and the noise value is based on a plurality of the pressure ratio signal 40 data points collected during a predetermined noise window.

In other embodiments, the controller 22 determines the end time $t_2$ of the first transition period $T_{tran1}$ by executing a signal stability determination algorithm. According to the signal stability-based determination algorithm, the equilibrium condition is met only when a RWR fulfills a set of predetermined stability criteria. The RWR describes a set of arrays of pressure ratio signals of predetermined length which are each truncated and then individually averaged. The stability criteria are composed of, among other factors: i) a maximum number of rolling windows to evaluate; ii) comparisons of truncated average pressure ratio signals from window to subsequent window; and iii) a comparison of the maximum versus minimum truncated average pressure ratio signals across the entire set of rolling windows.

In the illustrated embodiment, the controller 22 is configured to actuate the valve 20 between the first state (FIGS. 1 and 3) and the second state (FIGS. 2 and 4). The first transition period $T_{tran1}$ starts when the controller 22 actuates the valve 20 from the first state to the second state. In some embodiments, the controller 22 is also configured to actuate the valve 20 from the second state back to the first state immediately after the measurement window $W_{meas}$.

Referring to FIG. 5, a second transition period $T_{tran2}$ starts when the valve 20 is actuated from the second state (FIGS. 2 and 4) back to the first state (FIGS. 1 and 3). During the second transition period $T_{tran2}$, the second fluid 34 present within the second capillary 28 is displaced by the first fluid 32 injected from the first fluid injector 16. The controller 22 is similarly configured to determine the end time $t_4$ of the second transition period $T_{tran2}$ by executing the following steps: (a) defining a first interval window $W_n$; (b) defining a second interval window $W_{n+1}$ after the first interval window $W_n$; (c) determining whether an equilibrium condition has been met based on a comparison of respective average magnitudes of the pressure ratio signal 40 during the first and second interval windows $W_n$, $W_{n+1}$; (d) if the equilibrium condition has not been met, shifting the first interval window $W_n$ and the second interval window $W_{n+1}$ forward in time by a predetermined amount and repeating the determining step (c); and (e) if the equilibrium condition has been met, determining the end time $t_2$ of the second transition period $T_{tran2}$ to be an end time of the second interval window $W_{n+1}$.

In the illustrated embodiment, the viscosity that is determined by the controller 22 is an intrinsic viscosity (IV), which may be represented by $\eta$ and calculated by the equation:

$$\eta = \lim_{C \to 0} \frac{\eta_{specific}}{C} \quad (1)$$

wherein C is a concentration of the solute and $\eta_{specific}$ is specific viscosity, calculated by the equation:

$$\eta_{specific} = \eta_{relative} - 1 \quad (2)$$

wherein $\eta_{relative}$ is relative viscosity, calculated by the equation:

$$\eta_{relative} = \frac{\eta_{Eq2}}{\eta_{Eq1}} \quad (3)$$

wherein $\eta_{Eq1}$ is the magnitude of the pressure ratio signal 40 during the first equilibrium period $T_{Eq1}$, and $\eta_{Eq2}$ is the magnitude of the pressure ratio signal 40 during the second equilibrium period $T_{Eq2}$.

The functionality of the controller 22 can be implemented using analog and/or digital hardware (e.g., counters, switches, logic devices, memory devices, programmable processors, non-transitory computer-readable storage mediums), software, firmware, or a combination thereof. The controller 22 can perform one or more of the functions described herein by executing software, which can be stored, for example, in a memory device. A person having ordinary skill in the art would be able to adapt (e.g., construct, program) the controller 22 to perform the functionality described herein without undue experimentation. Although the controller 22 is described as being a discrete component separate from the first and second pressure modules 12, 14, for example, in other embodiments the controller 22 and first and second pressure modules 12, 14, or one or more components thereof, can be combined into a single component.

Another aspect of the invention involves a method for determining viscosity. Referring to FIGS. 1 and 2, the method includes the steps of: providing the first pressure module 12 having the first capillary 24; providing the second pressure module 14 having the second capillary 28; and providing the valve 20 fluidly connected between the first capillary 24 and the second capillary 28, the valve 20 having at least the first state and the second state. Referring to FIG. 5, the method further includes the steps of: generating a pressure ratio signal 40 corresponding to a ratio of respective pressure drops within the first capillary 24 and the second capillary 28; analyzing the pressure ratio signal 40 to determine an end time $t_2$ of a first transition period $T_{tran1}$ occurring between a first equilibrium period $T_{Eq1}$, during which the valve 20 is in the first state and only the first fluid 32 flows through the first capillary 24 and the second capillary 28, and a second equilibrium period $T_{Eq2}$, during which the valve 20 is in the second state (FIGS. 2 and 4) and only the first fluid 32 flows through the first capillary 24 and only the second fluid 34 flows through the second capillary 28; defining a measurement window $W_{meas}$ based on the determined end time $t_2$ of the first transition period $T_{tran1}$; and determining a viscosity of the second fluid 34 based on a magnitude of the pressure ratio signal 40 within the measurement window $W_{meas}$.

While several embodiments have been disclosed, it will be apparent to those having ordinary skill in the art that aspects of the present invention include many more embodiments. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:
1. A differential capillary viscometer, comprising:
a first pressure module having a first capillary and a first pressure sensor;
a second pressure module having a second capillary and a second pressure sensor;
a first fluid injector configured to inject a first fluid into the first pressure module such that the first fluid flows through the first capillary;
a second fluid injector configured to inject a second fluid into the second pressure module such that the second fluid flows through the second capillary;
a valve actuatable between at least a first state, in which the valve fluidly connects the second capillary to the first fluid injector via the first capillary, and a second state, in which the valve fluidly connects the second capillary to the second fluid injector; and
a controller configured to:
receive first pressure data generated by the first pressor sensor, the first pressure data indicative of a pressure drop within the first capillary;
receive second pressure data generated by the second pressor sensor, the second pressure data indicative of a pressure drop within the second capillary;
generate a pressure ratio signal corresponding to a ratio of respective magnitudes of the first pressure data and the second pressure data;

analyze the pressure ratio signal to determine an end time of a first transition period occurring between a first equilibrium period, during which the valve is in the first state and only the first fluid flows through the first capillary and the second capillary, and a second equilibrium period, during which the valve is in the second state and only the first fluid flows through the first capillary and only the second fluid flows through the second capillary;

define a measurement time window based on the determined end time of the first transition period; and determine a viscosity of the second fluid based on a magnitude of the pressure ratio signal within the measurement time window.

2. The differential capillary viscometer of claim 1, wherein the first fluid is a first solvent, the second fluid is a solution of a second solvent and a solute, and the first solvent and the second solvent have a same composition.

3. The differential capillary viscometer of claim 1, wherein the first fluid is a first solvent, the second fluid is a solution of a second solvent and a solute, and the first solvent and the second solvent have different compositions.

4. The differential capillary viscometer of claim 1, wherein in the first state, a first fluid loop of the valve receives the first fluid from the first capillary and outputs the first fluid to the second capillary, and a second fluid loop of the valve receives the second fluid from the second fluid injector; and wherein upon actuation from the first state to the second state, the second fluid in the second fluid loop is immediately output to the second capillary; and wherein during the first transition period, the first fluid present within the second capillary is displaced by the second fluid output to the second capillary.

5. The differential capillary viscometer of claim 1, wherein the valve is configured such that, during the first transition period, the first fluid present within the second capillary is displaced by the second fluid output to the second capillary.

6. The differential capillary viscometer of claim 1, wherein the controller determines the end time of the first transition period by executing a confidence-interval-based algorithm.

7. The differential capillary viscometer of claim 1, wherein the controller determines the end time of the first transition period by executing a signal stability determination algorithm.

8. The differential capillary viscometer of claim 7, wherein the equilibrium condition is met only when a rolling window range (RWR) satisfies the set of predetermined signal stability determination algorithm's criteria;

wherein the RWR describes a set of arrays of pressure ratio signals of predetermined length which are each truncated and then individually averaged; and wherein the stability criteria include at least one of:
a maximum number of rolling time windows to evaluate;
comparisons of truncated average pressure ratio signals from time window to subsequent time window; and
comparison of the maximum versus minimum truncated average pressure ratio signals across the entire set of rolling time windows.

9. The differential capillary viscometer of claim 7, wherein the pressure ratio signal is a discrete-time signal having a pressure ratio signal data points generated at a predetermined sample rate; and wherein the noise value is based on a plurality of the pressure ratio signal data points collected during a predetermined noise time window.

10. The differential capillary viscometer of claim 1, wherein the controller is configured to actuate the valve between the first state and the second state.

11. The differential capillary viscometer of claim 1, wherein the first transition period starts when the valve is actuated from the first state to the second state.

12. The differential capillary viscometer of claim 1, wherein the measurement time window starts at the determined end time of the first transition period.

13. The differential capillary viscometer of claim 1, wherein the measurement time window is not defined until after actuation of the valve from the first state to the second state.

14. The differential capillary viscometer of claim 1, wherein the measurement time window is a time period during the second equilibrium period.

15. The differential capillary viscometer of claim 1, wherein the measurement time window has a predetermined duration; and wherein the controller is configured to actuate the valve from the second state back to the first state immediately after the measurement time window.

16. The differential capillary viscometer of claim 15, wherein a second transition period starts when the valve is actuated from the second state back to the first state; and wherein, during the second transition period, the second fluid present within the second capillary is displaced by the first fluid injected from the first fluid injector.

17. The differential capillary viscometer of claim 16, wherein the controller determines the end time of the second transition period by executing the following steps:
a) defining a first interval time window;
b) defining a second interval time window after the first interval time window;
c) determining whether an equilibrium condition has been met based on a comparison of respective average magnitudes of the pressure ratio signal during the first and second interval time windows;
d) if the equilibrium condition has not been met, shifting the first interval time window and the second time interval window forward in time by a predetermined amount and repeating the determining step c); and
e) if the equilibrium condition has been met, determining the end time of the first transition period to be an end time of the second interval time window.

18. The differential capillary viscometer of claim 1, wherein the valve is an 8-port, 2-position valve.

19. The differential capillary viscometer of claim 1, further comprising a constant temperature chamber that houses at least one of the first pressure module and the second pressure module.

20. The differential capillary viscometer of claim 1, wherein the controller determines the end time of the first transition period by executing the following steps:
defining a first interval time window;
defining a second interval time window after the first interval time window; and
determining whether an equilibrium condition has been met based on a comparison of respective average magnitudes of the pressure ratio signal during the first and second interval time windows.

21. The differential capillary viscometer of claim 20, wherein the steps executed by the controller to determine the end time of the first transition period further comprise the step of:
if the equilibrium condition has been met, determining the end time of the first transition period to be an end time of the second interval time window.

22. The differential capillary viscometer of claim 20, wherein the steps executed by the controller to determine the end time of the first transition period further comprise the step of:
if the equilibrium condition has not been met, shifting the first interval time window and the second interval time window forward in time by a predetermined amount and repeating the step of whether the equilibrium condition has been met.

23. The differential capillary viscometer of claim 20, wherein the equilibrium condition is met only when a rolling window range (RWR) value is less than or equal to a confidence value.

24. The differential capillary viscometer of claim 23, wherein the RWR value is equal to the average magnitude of the pressure ratio signal during the first interval time window divided by the average magnitude of the pressure ratio signal during the second interval time window.

25. The differential capillary viscometer of claim 23, wherein the confidence value is equal to a noise value divided by a confidence factor.

26. A viscometer, comprising:
a first capillary;
a second capillary;
a first fluid injector;
a second fluid injector;
a valve having a first state in which the valve connects the second capillary to the first fluid injector via the first capillary, and a second state in which the valve connects the second capillary to the second fluid injector;
a controller configured to:
receive pressure data indicative of respective pressure drops within the first capillary and the second capillary during fluid flow therethrough;
generate a pressure ratio signal from the pressure data;
analyze the pressure ratio signal to determine an end of a transition between a first equilibrium when the valve is in the first state, and a second equilibrium when the valve is in the second state;
define a measurement time window based on the end of the transition; and
determine a viscosity of the second fluid based on the pressure ratio signal during the measurement time window.

27. The viscometer of claim 26, wherein the controller determines the end time of the first transition period by executing the following steps:
defining a first interval time window;
defining a second interval time window after the first interval time window; and
determining whether an equilibrium condition has been met based on a comparison of respective average magnitudes of the pressure ratio signal during the first and second interval time windows.

28. The viscometer of claim 27, wherein the steps executed by the controller to determine the end time of the first transition period further comprise the step of:
if the equilibrium condition has been met, determining the end time of the first transition period to be an end time of the second interval time window.

29. The viscometer of claim 27, wherein the steps executed by the controller to determine the end time of the first transition period further comprise the step of:
if the equilibrium condition has not been met, shifting the first interval time window and the second interval time window forward in time by a predetermined amount and repeating the step of whether the equilibrium condition has been met.

30. The viscometer of claim 27, wherein the equilibrium condition is met only when a rolling window range (RWR) value is less than or equal to a confidence value.

31. The viscometer of claim 30, wherein the RWR value is equal to the average magnitude of the pressure ratio signal during the first interval time window divided by the average magnitude of the pressure ratio signal during the second interval time window.

32. The viscometer of claim 30, wherein the confidence value is equal to a noise value divided by a confidence factor.

33. A method for determining viscosity, comprising:
providing a first pressure module having a first capillary;
providing a second pressure module having a second capillary;
providing a valve fluidly connected between the first capillary and the second capillary, the valve having at least a first state and a second state;
generating a pressure ratio signal corresponding to a ratio of respective pressure drops within the first capillary and the second capillary;
analyzing the pressure ratio signal to determine an end time of a first transition period occurring between a first equilibrium period, during which the valve is in the first state and only the first fluid flows through the first capillary and the second capillary, and a second equilibrium period, during which the valve is in the second state and only the first fluid flows through the first capillary and only the second fluid flows through the second capillary;
defining a measurement time window based on the determined end time of the first transition period; and
determining a viscosity of the second fluid based on a magnitude of the pressure ratio signal within the measurement time window.

34. The method of claim 33, wherein the step of analyzing the pressure ratio signal to determine the end time of the first transition period further comprises the steps of:
defining a first interval time window;
defining a second interval time window after the first interval time window; and
determining whether an equilibrium condition has been met based on a comparison of respective average magnitudes of the pressure ratio signal during the first and second interval time windows.

35. The method of claim 34, wherein the step of analyzing the pressure ratio signal to determine the end time of the first transition period further comprises the step of:
if the equilibrium condition has been met, determining the end time of the first transition period to be an end time of the second interval time window.

36. The method of claim 34, wherein the step of analyzing the pressure ratio signal to determine the end time of the first transition period further comprises the step of:
if the equilibrium condition has not been met, shifting the first interval time window and the second interval time window forward in time by a predetermined amount and repeating the step of determining whether the equilibrium condition has been met.

37. The method of claim 34, wherein the equilibrium condition is met only when a rolling window range (RWR) value is less than or equal to a confidence value.

38. The method of claim 37, wherein the RWR value is equal to the average magnitude of the pressure ratio signal during the first interval time window divided by the average magnitude of the pressure ratio signal during the second interval time window.

39. The method of claim 37, wherein the confidence value is equal to a noise value divided by a confidence factor.

\* \* \* \* \*